(12) United States Patent
Katz

(10) Patent No.: US 6,643,526 B1
(45) Date of Patent: Nov. 4, 2003

(54) METHOD AND APPARATUS FOR DIRECTIONAL RADIO COMMUNICATION

(75) Inventor: Marcos Katz, Oulu (FI)

(73) Assignee: Nokia Telecommunications Oy, Espoo (FI)

( * ) Notice: Subject to any disclaimer, the term of this patent is extended or adjusted under 35 U.S.C. 154(b) by 0 days.

(21) Appl. No.: 09/367,116

(22) PCT Filed: Jul. 21, 1997

(86) PCT No.: PCT/EP97/03917

§ 371 (c)(1),
(2), (4) Date: Sep. 17, 1999

(87) PCT Pub. No.: WO98/36599

PCT Pub. Date: Aug. 20, 1998

(30) Foreign Application Priority Data

Feb. 13, 1997  (WO) ................................ PCT/EP97/00665

(51) Int. Cl.[7] .................... H04B 1/10; H04B 15/00; H04B 1/38; H04M 1/00
(52) U.S. Cl. .................... 455/562; 455/561; 455/63; 455/67.1; 455/67.3; 455/277.2; 342/359
(58) Field of Search .................... 455/63, 67.1, 67.3, 455/73, 269, 277.1, 277.2, 561, 562, 550, 39; 342/359, 360, 368, 383, 350

(56) References Cited

U.S. PATENT DOCUMENTS

| | | |
|---|---|---|
| 4,527,284 A | 7/1985 | Röttger |
| 4,901,085 A | 2/1990 | Spring et al. |
| 5,515,378 A | 5/1996 | Roy, III et al. |
| 5,576,717 A | 11/1996 | Searle et al. |
| 5,610,617 A | 3/1997 | Gans et al. |
| 5,621,752 A | 4/1997 | Antonio et al. |
| 5,745,858 A | 4/1998 | Sato et al. |
| 5,771,017 A | 6/1998 | Dean et al. |
| 5,809,422 A | 9/1998 | Raleigh et al. |
| 5,856,804 A | 1/1999 | Turcotte et al. |
| 5,884,187 A | 3/1999 | Ziv et al. |
| 5,893,033 A | 4/1999 | Keskitalo et al. |
| 5,894,598 A | 4/1999 | Shoki |
| 5,940,774 A | 8/1999 | Schmidt et al. |
| 5,999,800 A | 12/1999 | Choi et al. |
| 6,018,643 A | 1/2000 | Golemon et al. |
| 6,038,459 A | 3/2000 | Searle et al. |
| 6,097,970 A | 8/2000 | Angus et al. |
| 6,167,036 A * | 12/2000 | Beven .......................... 455/442 |
| 6,185,440 B1 * | 2/2001 | Barratt et al. ............... 455/562 |
| 6,195,567 B1 | 2/2001 | Lee |
| 6,233,466 B1 | 5/2001 | Wong et al. |
| 6,301,238 B1 | 10/2001 | Hagerman et al. |
| 6,393,303 B1 * | 5/2002 | Katz ........................ 455/562 |

FOREIGN PATENT DOCUMENTS

| | | |
|---|---|---|
| EP | 647 978 | 4/1995 |
| EP | 715 478 | 6/1996 |
| EP | 729 285 | 8/1996 |
| EP | 755 090 | 1/1997 |
| EP | 755 093 | 1/1997 |
| WO | 96/00466 | 1/1996 |
| WO | 96/09696 | 3/1996 |
| WO | 96/37969 | 11/1996 |

\* cited by examiner

*Primary Examiner*—Nay Maung
*Assistant Examiner*—Edan Orgad
(74) *Attorney, Agent, or Firm*—Merchant & Gould P.C.

(57) ABSTRACT

A method of directional radio communication between a first station (6) and a second station, comprising the steps of defining at the first station (6) a plurality of beam directions ($b_1$–$b_8$) for transmitting signals to said second station, each of said beam directions being selectable. A plurality of beam directions are selected at said first station in which a signal is to be transmitted form said first station to said second station. Said signal i transmitted in said plurality of beam directions, whereby the power level of the signal transmitted in each of said selected plurality of beam directions is individually selectable.

28 Claims, 7 Drawing Sheets

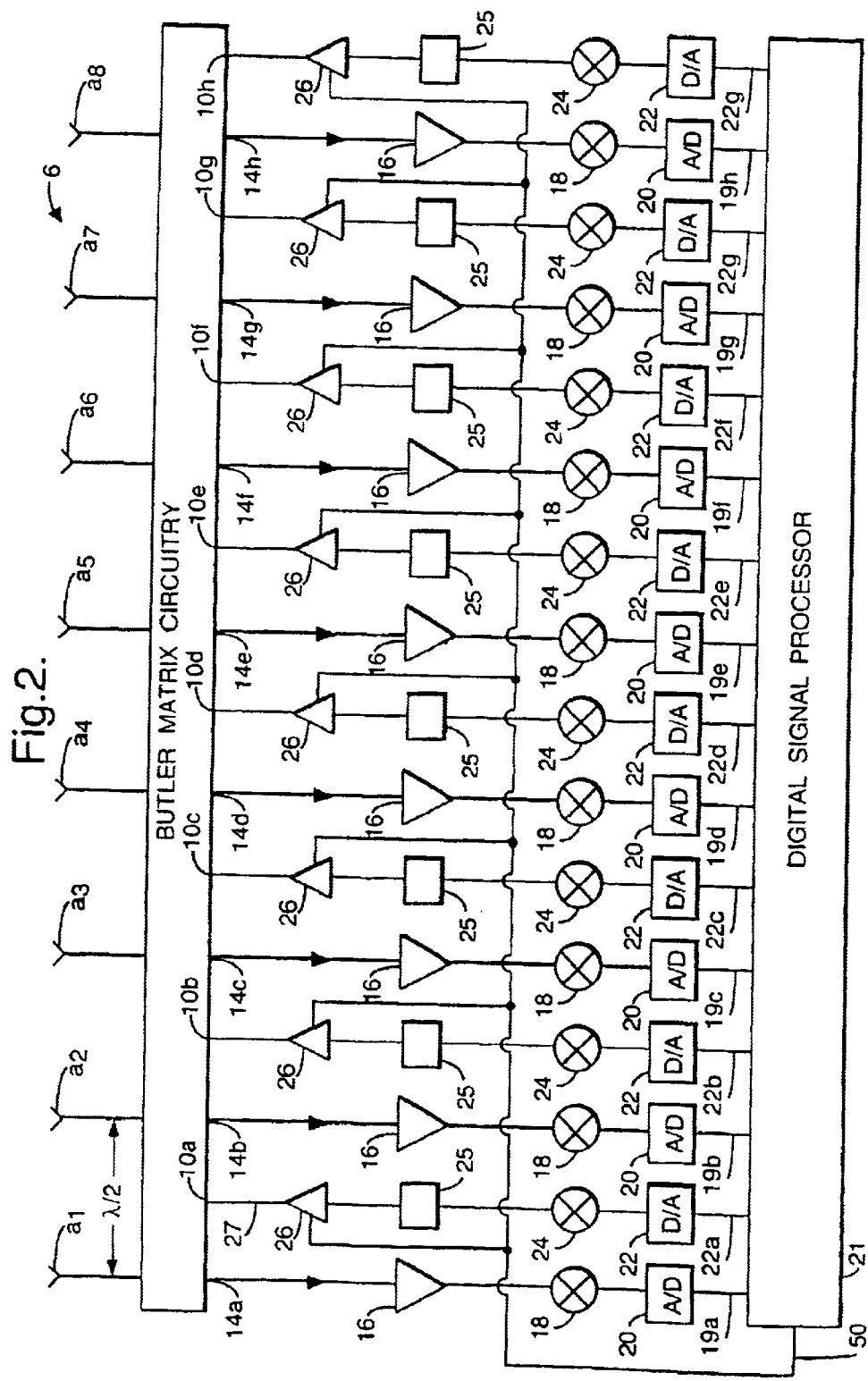

BEAMS-SELECTED: 5 & 6, RANDOM PHASE DIFFERENCE

METHOD AND APPARATUS FOR DIRECTIONAL RADIO COMMUNICATION

The present invention relates to a method and apparatus for directional radio communication in which signals between a first station and a second station may be transmitted only in certain directions. In particular, but not exclusively, the present invention is applicable to cellular communication networks using space division multiple access (SDMA).

With currently implemented cellular communication networks, a base transceiver station (BTS) is provided which transmits signals intended for a given mobile station (MS), which may be a mobile telephone, throughout a cell or cell sector served by that base transceiver station. However, space division multiple access (SDMA) systems have now been proposed. In a space division multiple access system, the base transceiver station will not transmit signals intended for a given mobile station throughout the cell or cell sector but will only transmit the signal in the beam direction from which a signal from the mobile station is received. SDMA systems may also permit the base transceiver station to determine the direction from which signals from the mobile station are received.

SDMA systems may allow a number of advantages over existing systems to be achieved. In particular, as the beam which is transmitted by the BTS may only be transmitted in a particular direction and accordingly may be relatively narrow, the power of the transceiver can be concentrated into that narrow beam. Likewise, the signal transmitted to the BTS by, for example, a MS will be received by the BTS only in a limited number of beam directions. It is believed that this results in a better signal to noise ratio with both the signals transmitted from the base transceiver station and the signals received by the base transceiver station. Additionally, as a result of the directionality of the base transceiver station, an improvement in the signal to interference ratio of the signal received by the base transceiver station can be achieved. Furthermore, in the transmitting direction, the directionality of the BTS allows energy to be concentrated into a narrow beam so that the signal transmitted by the BTS can reach far away located mobile stations with lower power levels than required by a conventional BTS. This may allow mobile stations to operate successfully at greater distances from the base transceiver station which in turn means that the size of each cell or cell sector of the cellular network can be increased. As a consequence of the larger cell size, the number of base stations which are required can also be reduced leading to lower network costs. SDMA systems generally require a number of antenna elements in order to achieve the required plurality of different beam directions in which signals can be transmitted and received. The provision of a plurality of antenna elements increases the sensitivity of the BTS to received signals. This means that larger cell sizes do not adversely affect the reception of signals by the BTS from mobile stations.

SDMA systems may also increase the capacity of the system, that is the number of mobile stations which can be simultaneously supported by the system is increased. This is due to the directional nature of the communication which means that the BTS will pick up less interference from mobile stations in other cells using the same frequency. The BTS will generate less interference to other mobile stations in other cells using the same frequency when communicating with a given MS in the associated cell.

Ultimately, it is believed that SDMA systems will allow the same frequency to be used simultaneously to transmit to two or even more different mobile stations which are arranged at different locations within the same cell. This can lead to a significant increase in the amount of traffic which can be carried by cellular networks.

SDMA systems can be implemented in analogue and digital cellular networks and may be incorporated in the various existing standards such as GSM, DCS 1800, TACS, AMPS and NMT as well as he proposed next generation standards such as, for example, UMTS (Universal Mobile Telecommunications System). SDMA systems can also be used in conjunction with other existing multiple access techniques such as time division multiple access (TDMA), code division multiple access (CDMA) and frequency division multiple access (FDMA) techniques.

One problem with SDMA systems is that the direction in which signals should be transmitted to a mobile station needs to be determined. In certain circumstances, a relatively narrow beam will be used to send a signal from a base transceiver station to a mobile station. Therefore, the direction of that mobile station needs to be assessed reasonably accurately. As is known, a signal from a mobile station will generally follow several paths to the ETS. Those plurality of paths are generally referred to as multipaths. A given signal which is transmitted by the mobile station may then be received by the base transceiver station from more than one direction due to these multipath effects.

In general, the decision as to the beam direction which is to be used by the BTS in order to transmit a signal to a mobile station is based on information corresponding to the data burst previously received by the BTS from the given MS. As the decision is based on information received corresponding to only one burst, problems may occur if, for example, the data burst transmitted by the mobile station is superimposed with strong interference.

An additional problem is that the direction in which a signal is to be transmitted by the BTS to the mobile station is determined on the basis of the signals received by the BTS from the mobile station. However, the frequencies of the signals transmitted from the mobile station to the BTS are different from the frequencies used for the signals transmitted by the BTS to the mobile station. The difference in the frequencies used in the uplink and downlink signals means that the behaviour of the channel in the uplink direction may be different from the behaviour of the channel in the downlink direction. Thus the optimum direction determined for the uplink signals will not always be the optimum direction for the downlink signals. In other words, the statistical behaviour of the channel in the up-link and down-link directions are different. This also means that it is not possible to have a fast and effective (burst-by-burst basis) power control as there is in general no fast (burst-by-burst) feedback from the MS.

It has been proposed by the present inventor that a signal from a base transceiver station to a mobile station be sent in two adjacent beam directions. This means that the base station generates two or more separate beams. When those beams are adjacent one another, they should overlap. By allowing the beams to overlap the whole cell or cell sector can be covered. However, due to differences in the effective path length travelled by the signals to a beam former of the base transceiver station, adjacent beams may have an effective phase difference therebetween. Depending on the value of this phase difference, a null region may occur in the overlapping region of two adjacent beams. Any mobile station in that null region would be unable to receive signals from the base transceiver station. Another problem arises when more than one beam direction is selected. If the power of the beams is set to be equal, this can undesirably give rise to increased interference.

It is therefore an aim of certain embodiments of the present invention to address some of the problems mentioned hereinbefore.

According to a first aspect of the present invention, there is provided a method of directional radio communication between a first station and a second station, said method comprising the steps of defining at the first station a plurality of beam directions for transmitting signals to said second station, each of said beam directions being selectable; selecting a plurality of beam directions at said first station in which a signal is to be transmitted from said first station to said second station; consecutively transmitting said signal in said plurality of beam directions, whereby the power level of the signal transmitted in each of said selected plurality of beam directions is individually selectable.

For the purpose of this document, the term signal should be broadly interpreted. For example, a burst of data in a GSM system may constitute "a signal". Alternatively, a plurality of bursts of data in a GSM system may constitute "a signal".

It has been recognized that better results can be achieved, where two or more beams are selected if the power of each of the selected beams is individually selectable.

By also altering the power of each beam, a more flexible shaping of the beam pattern can be obtained thus reducing the possible interference to non-desired stations. This in turn means that it might be possible to improve the system capacity. Thus, if the power of each beam is individually selectable, it is possible to flexibly alter the shape of the beam pattern.

Preferably, first and second sequential signals are to be transmitted to said second station, said method further comprising the steps of:

altering the phase of the first and second signals to be transmitted in at least one of said selected beam directions;

whereby the phase of the first signal transmitted in at least two of the beam directions differs, the phase of the second signal transmitted in said at least two beam directions differs and the phase difference of the first signal transmitted in said at least two beam directions is different from the phase difference of said second signal transmitted in said at least two beam directions.

By ensuring that the phase difference of the first signal transmitted in the two beam directions is different from the phase difference of the second signal transmitted in the two beam directions, the problems caused by null regions can be considerably reduced. In particular, even if a null region occurs for one signal, it is unlikely to be present for the second signal in that the phase difference between adjacent beams is changed for the next signal. It should be appreciated that the phase of the signals transmitted in one beam direction may be unaltered but the phase of the signals in another beam direction may be altered. Alternatively, the phase of the signals may be altered for all of the selected beam directions.

Preferably, at least two of the beam directions are adjacent. It is preferred that the first station be arranged to transmit a multiplicity of consecutive signals to the second station and that the phase of each signal be altered such that the phase difference between each consecutive signal transmitted in at least two of the beam directions is different for consecutive signals. Thus, when the response of the first station is averaged over time, the probability that null regions occur can be reduced.

Preferably, the phase of the consecutive signals is randomly altered. The random alteration of the phase is able to create a spatial modulation of the resulting beam pattern, particularly when considered over a relatively large number of consecutive signals. However, it is also possible that the phase of the consecutive signals can be altered in accordance with a predetermined pattern. It is preferred that this predetermined pattern allows the desired spatial modulation of the beam pattern to be achieved.

Preferably, method also includes the steps of receiving at said first station a plurality of signals from said second station, said signals being receivable from a plurality of beam directions; determining for at least one of said beam directions a value of a parameter of at least one signal received from said second station in said at least one beam direction; looking up in a look-up table a power value corresponding to the determined value; and transmitting a signal to the second station in said at least one beam direction, the power of the signal transmitted in said at least one beam direction being determined by the power value looked up in the look-up table. Preferably the received signals are consecutive According to a second aspect of the present invention, there is provided a method of directional radio communication between a first and a second station, said method comprising the steps of receiving at said first station a plurality of consecutive signals from said second station, said signals being receivable from a plurality of beam directions; determining for at least one of said beam directions a value of a parameter of at least one signal received from said second station in said at least one beam direction; looking up in a look-up table a power value corresponding to the determined value; and transmitting a second signal to said second station in said at least one beam direction, the power of the signal in said at least one beam direction being determined by the power value looked up in the look-up table.

The use of a look-up table is particularly advantageous in that it provides a simple way of determining the power level of a signal to be transmitted to the second station.

Preferably, a mean value of the parameter for a plurality of signals is determined and the power value corresponding to the determined mean value is looked up in a look-up table. This parameter may be the energy of the signals. Alternatively, the parameter can be one or more of the following parameters: instantaneous energy of a signal; type of radio environment; or distance between the first and second stations.

There are advantages in being able to determine the power of a signal to be transmitted to the second station based on an average of a number of preceding signals received from that second station. This is because although for a single signal the behaviour of a channel between the first station and the second station is not the same as a channel between the second station and the first station, on average, the behaviour of the channels in both directions will be similar. By taking into account the signals received over a period of time, it can be assumed that the channel between the first station and the second station will on average be similar to that between the second station and the first station. It will be noted that this method of determining the power will generally be effective on average and not necessarily effective for every single signal.

The mean energy determined in said determining step may be quantized and the quantized mean energy be associated by the look-up table with a corresponding power value. This makes the look-up table easier to achieve in practice.

The power value represents the power of the signal to be transmitted in the beam direction or alternatively may represent a control value for controlling the setting of a power level for a signal in a given beam direction. For example, if an amplifier were present, the control value could be used to control the amplifier to provide the required signal amplification.

The values in the look-up table may be altered in accordance with a parameter of the first station and/or the second station. Alternatively, the values of the look-up table may be fixed and not be alterable. Where the values of the look-up table are altered, they may be altered in accordance with the power measuring reports received from the second station. The values for the look-up table are preferably determined based on one or more of the following:

transmission power used by said second station;
distance between said first and second station;
the mean energy of the signals received from the second station in a given beam direction;
distance between the first and second station;
the radio environment;
the validity of a known attenuation law in a channel defined between the first and second stations.

The number of signals used to calculate the mean value may be varied depending for example on the degree of correlation between the channel between the first station and the second station and the channel between the second station and the first station. The number of signals used to calculate the mean value may be dependent on the signal quality reports received from the second station.

The energy of each of the signals received in the given beam direction is preferably determined from the channel impulse response. This calculation is generally carried out by most communication networks and thus can be utilised by embodiments of the present invention.

Preferably, the first station is a base transceiver station in a cellular network. The second station is preferably a mobile station in said cellular network. Preferably, the signals are burst, and the phase is altered on a burst-by-burst basis.

As will be appreciated, aspects of the first invention can be used with aspects of the second invention and vice-versa.

According to a third aspect of the present invention, there is provided a first station for directional radio communication with the second station, said apparatus comprising transmitter means for transmitting a signal in a plurality of beam directions, each of said beam directions being selectable; selection means for selecting a plurality of beam directions in which a signal is to be transmitted from the first station to the second station; and control means for controlling said transmitter means, wherein said control means is arranged to individually control the power level of the signal transmitted in each of said selected beam directions.

Preferably, said station is arranged to transmit first and second signals to said second station, said first station comprising phase altering means for altering the phase of the first and second signals to be sent in at least one of the selected beam directions; and wherein said control means is arranged to control the transmitter means to transmit the first and second signals in said plurality of beam directions, whereby the phase of the first signal in at least two of the beam directions differs, the phase of the second signal in said at least two of the beam directions differs and the phase difference of said first signal in said at least two beam directions is different from the phase difference of the second signal in said at least two beam directions.

Preferably, the means for altering the phase comprises a phase modulator. The phase modulator may be arranged between the input of a beam former of said transmitting means and a signal processor of the first station.

According to a fourth aspect of the present invention, there is provided a first station for directional radio communication with a second mobile station, said apparatus comprising receiving means for receiving a plurality of consecutive signals transmitted by said second station, said signals being receivable from a plurality of different beam directions; determining means for determining for at least one of the beam directions the value of a parameter of at least one of signals received from the second station in said at least one beam direction; a look-up table for providing power values corresponding to the determined value; and transmitting means for transmitting a second signal to the second station in said at least one beam direction, the power level of the signal being determined by the power value looked-up in the look-up table.

The determining means may be arranged to determine a mean value of the parameter for a plurality of signals. The parameter may be the energy of the signal.

Preferably, the transmitter means of either the third or the fourth aspect comprise an antenna array which is arranged to provide a plurality of signal beams in a plurality of different directions.

For a better understanding of the present invention and as to how the same may be carried into effect, reference will now be made by way of example to the accompanying drawings in which:

FIG. 2 shows a simplified representation of an antenna array and the base transceiver station;

Figure 1:
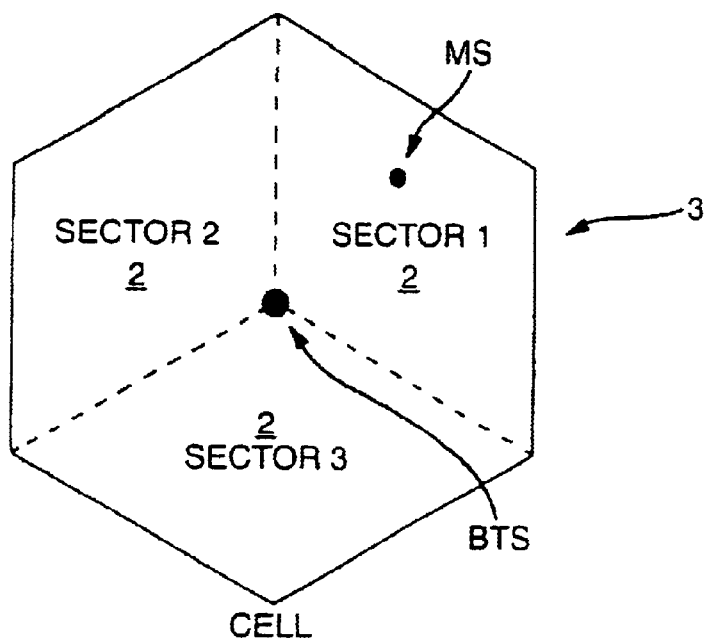
FIG. 1 shows a schematic view of a base transceiver station (BTS) and its associated cell sectors.

Reference will first be made to FIG. 1 in which three cell sectors 2 defining a cell 3 of a cellular mobile telephone network are shown. The three cell sectors 2 are served by respective base transceiver stations (BTS) 4. Three separate base transceiver stations 4 are provided at the same location. Each BTS 4 has a separate transceiver which transmits and receives signals to and from a respective one of the three cell sectors 2. Thus, one dedicated base transceiver station is provided for each cell sector 2. The BTS 4 is thus able to communicate with mobile stations (MS) such as mobile telephones which are located in the respective cell sector 2.

The present embodiment is described in the context of a GSM (Global System for Mobile Communications) network. In the GSM system, a frequency/time division multiple access F/TDMA system is used. Data is transmitted between the BTS 4 and the MS in bursts. The data bursts include a training sequence which is a known sequence of data. The purpose of the training sequence will be described hereinafter. Each data burst is transmitted in a given frequency band in a predetermined time slot in that frequency band. The use of a directional antenna array allows space division multiple access also to be achieved. Thus, in embodiments of the present invention, each data burst will be transmitted in a given frequency band, in a given time slot, and in a given direction. An associated channel can be defined for a given data burst transmitted in the given frequency, in the given time slot, and in the given direction. As will be discussed in more detail hereinafter, in some embodiments of the present invention, the same data burst is transmitted in the same frequency band, in the same time slot but in two different directions.

FIG. 2 shows a schematic view of one antenna array 6 of one BTS 4 which acts as a transceiver; It should be appreciated that the array 6 shown in FIG. 2 only serves one of the three cell sectors 2 shown in FIG. 1. Another two antenna arrays 6 are provided to serve the other two cell sectors 2. The antenna array 6 has eight antenna elements $a_1 \ldots a_8$. The elements $a_1 \ldots a_8$ are arranged to have a spacing of a half wavelength between each antenna element $a_1 \ldots a_8$ and are arranged in a horizontal row in a straight line. Each antenna element $a_1 \ldots a_8$ is arranged to transmit and receive signals and can have any suitable construction. Each antenna element $a_1 \ldots a_8$ may be a dipole antenna, a patch antenna or any other suitable antenna. The eight antenna elements $a_1 \ldots a_8$ together define a phased array antenna 6.

Figure 3:
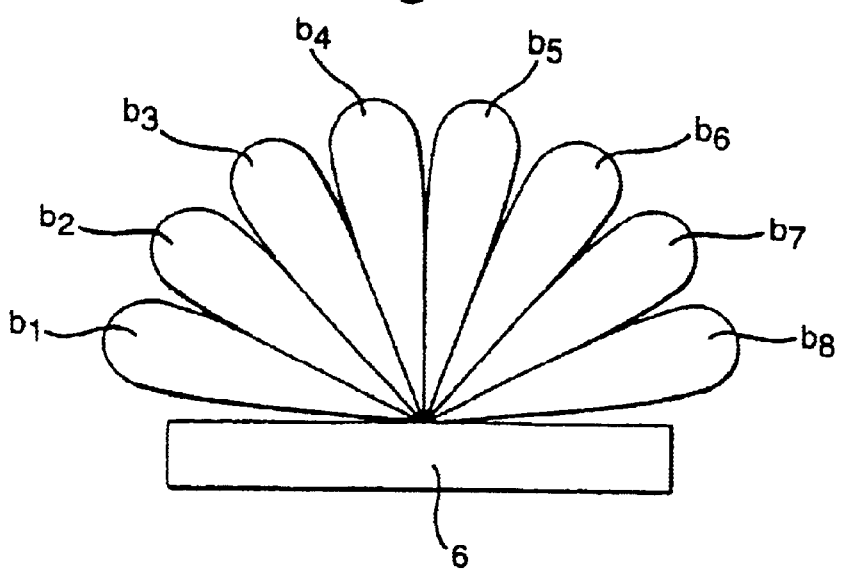
FIG. 3 shows the fixed beam pattern provided by the antenna array of FIG. 2.

As is known, each antenna element $a_1 \ldots a_8$ of the phased array antenna 6 is supplied with the same signal to be transmitted to a mobile station MS. However, the phases of the signals supplied to the respective antenna elements $a_1 \ldots a_8$ are shifted with respect to each other. The differences in the phase relationship between the signals supplied to the respective antenna elements $a_1 \ldots a_8$ gives rise to a directional radiation pattern. Thus, a signal from the BTS 4 can only be transmitted in certain directions in the cell sector 2 associated with the array 6. The directional radiation pattern achieved by the array 6 is a consequence of constructive and destructive interference which arises between the signals which are phase shifted with respect to each other and transmitted by each antenna element $a_1 \ldots a_8$. In this regard, reference is made to FIG. 3 which illustrates schematically the directional radiation pattern which is achieved with the antenna array 6. It should be appreciated that in practice adjacent beams will overlap one another to ensure that all of the cell sector 2 is served by the antenna array 6. The antenna array 6 can be controlled to provide a beam $b_1 \ldots b_8$ in any one of the eight directions illustrated in FIG. 3. For example, the antenna array 6 could be controlled to transmit a signal to a MS only in the direction of beam $b_5$ or only in the direction of beam $b_6$. As will be discussed in further detail hereinafter, it is possible also to control the antenna array 6 to transmit a signal in more than one beam direction at the same time. For example, a signal may be transmitted in the two directions defined by beam $b_5$ and beam $b_6$. FIG. 3 is only a schematic representation of the eight possible beam directions which can be achieved with the antenna array 6.

The relative phase of the signal provided at each antenna element $a_1 \ldots a_8$ is controlled by Butler matrix circuitry 8 so that a signal can be transmitted in the desired beam direction or directions. The Butler matrix circuitry 8 thus provides a phase shifting function. The Butler matrix circuitry 8 has eight inputs 10a–h from the BTS 4 and eight outputs, one to each antenna element $a_1 \ldots a_8$. The signals received by the respective inputs 10a–h comprise the data bursts to be transmitted. Each of the eight inputs 10a–h represents the beam direction in which a given data burst could be transmitted. For example, when the Butler matrix circuitry 8 receives a signal on the first input 10a, the Butler matrix circuitry 8 applies the signal provided on input 10a to each of the antenna elements $a_1 \ldots a_8$ with the required phase differences to cause beam $b_1$ to be produced so that the data burst is transmitted in the direction of beam $b_1$. Likewise, a signal provided on input 10b causes a beam in the direction of beam $b_2$ to be produced and so on.

As already discussed, the antenna elements $a_1 \ldots a_8$ of the antenna array 6 receive signals from a MS as well as transmit signals to a MS. A signal transmitted by a MS will generally be received by each of the eight antenna elements $a_1 \ldots a_8$. However, there will be a phase difference between each of the signals received by the respective antenna elements $a_1 \ldots a_8$. With the assistance of the Butler matrix circuitry 8 it is possible to determine from the relative phases of the signals received by the respective antenna elements $a_1 \ldots a_8$ the beam direction from which the signal has been received. The Butler matrix circuitry 8 thus has eight inputs, one from each of the antenna elements $a_1 \ldots a_8$ for the signal received by each antenna element. The Butler matrix circuitry 8 also has eight outputs 14a–h. Each of the outputs 14a to 14h corresponds to a particular beam direction from which a given data burst could be received. For example, if the antenna array 6 receives a signal from a MS from the direction of beam $b_1$, then the Butler matrix circuitry 8 will output the received signal on output 14a. A received signal from the direction of beam $b_2$ will cause the received signal to be output from the Butler matrix circuitry 8 on output 14b and so on. In practice, a signal is unlikely to be received from just a single beam direction due to side lobes and/or multipath effects. However, the level or amplitude of the signal received in a number of beam directions will often be quite low and as such can, in some embodiments of the present invention be disregarded. In summary, the Butler matrix circuitry 8 will receive on the antenna elements $a_1 \ldots a_8$ eight versions of the same signal which are phase shifted with respect to one another. From the relative phase shifts, it is possible with the assistance of the Butler matrix circuitry 8 to determine the direction from which the received signal has been received and outputs a signal on a given output 14a–h in dependence on the direction from which the signal has been received.

It should be appreciated that in some environments, a single signal or data burst from a MS may appear to come from more than one beam direction due to reflection of the signal whilst it travels between the MS and the BTS 4, provided that the reflections have a relatively wide angular spread. The Butler matrix circuitry 8 will provide a signal on each output 14a–h corresponding to each of the beam directions from which a given signal or data burst appears to come. Thus, the same data burst may be provided on more than one output 14a–h of the Butler matrix circuitry 8. However, the signals on the respective outputs 14a–h may be time delayed with respect to each other.

Each output 14a–h of the Butler matrix circuitry 8 is connected to the input of a respective amplifier 16 which amplifies the received signal. One amplifier 16 is provided for each output 14a–h of the Butler matrix circuitry 8. The amplified signal is then processed by a respective processor 18 which manipulates the amplified signal to reduce the frequency of the received signal to the baseband frequency so that the signal can be processed by the BTS 4. To achieve this, the processor 18 removes the carrier frequency component from the input signal. Again, one processor 18 is provided for each output 14a–h of the Butler matrix circuitry 8. The received signal, which is in analogue form, is then converted into a digital signal by an analogue to digital (A/D) converter 20. Eight A/D converters 20 are provided, one for each output 14a–h of the Butler matrix circuitry 8. The digital signal is there input to a digital signal processor 21 via a respective input 19a–h for further processing.

The digital signal processor 21 also has eight outputs 22a–h, each of which outputs a digital signal which represents the signal which is to be transmitted to a given MS. The output 22a–h selected represents the beam direction in which the signal is to be transmitted. That digital signal is converted to an analogue signal by a digital to analogue (D/A) converter 23. One digital to analogue converter 23 is provided for each output 22a–h of the digital signal processor 21. The analogue signal is then processed by processor 24 which is a modulator which modulates onto the carrier frequency the analogue signal to be transmitted. Prior to the processing of the signal by the processor 24, the signal is at the baseband frequency. The resulting signal is then output to a respective phase modulator 25. One phase modulator 25 is provided for each processor 24 and the output of the respective phase modulators 25 are passed to respective power amplifiers 26 which amplify the respective signals. Again one power amplifier is provided for each phase Modulator 25. The output of the respective power amplifiers 26 are provided to respective inputs 10a–h of the Butler matrix circuitry 8. Thus, a processor 24, an amplifier 26 and a phase modulator 25 are provided for each output 22a–h of the digital signal processor 21.

Each phase modulator 25 is arranged to change the phase of the respective signal to be applied to the corresponding input 10a–h of the Butler matrix circuitry 8, on a burst by burst basis. In other words the phase of the signal applied to a given input 10a–h of the Butler matrix circuitry 8 differs for consecutive bursts. In the preferred embodiment of the present invention, the phase modulators 25 randomly alter the phase of the signals on a burst by burst basis. However, in one modification the phase is not altered randomly but is instead altered in a predetermined manner. The function of the phase modulators 25 will be described in more detail hereinafter. As mentioned hereinbefore, one or more of the inputs 10a–h of the Butler matrix circuitry may be arranged to have the same signal applied thereto. In preferred embodiments, the phase of the signal applied for a given burst to different inputs will be different at different inputs. This will be described in more. detail hereinafter.

Figure 4:
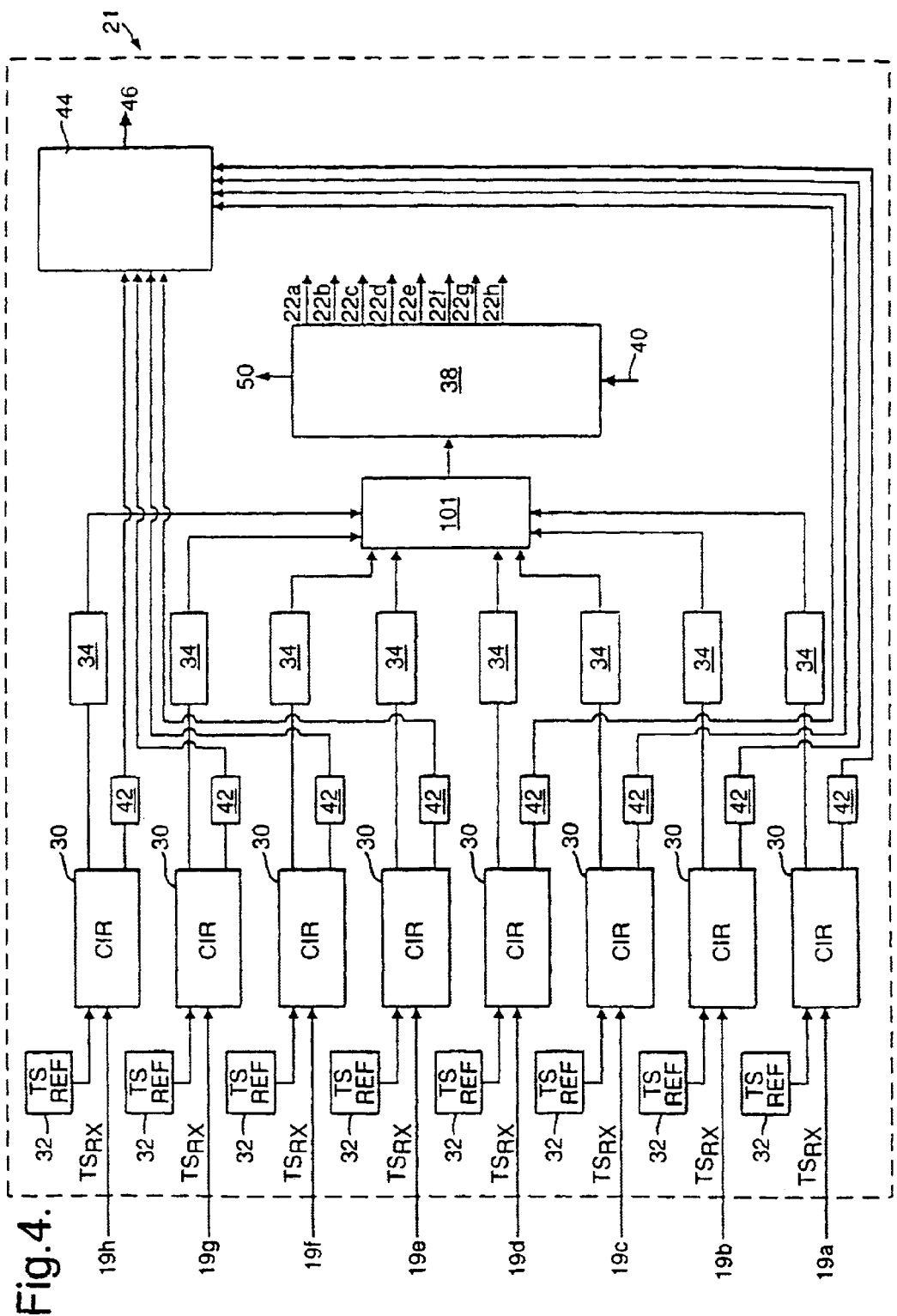
FIG. 4 shows a schematic view of the digital signal processor of FIG. 2.

Reference will now be made to FIG. 4 which schematically illustrates in more detail the digital signal processor 21. It should be appreciated that the various blocks illustrated in FIG. 4 do not necessarily correspond to separate elements of An actual digital signal processor 21 embodying the present invention. In particular, the various blocks illustrated in FIG. 4 correspond to various functions carried out by the digital signal processor 21. In one embodiment of the present invention, the digital signal processor 21 is at least partially implemented in integrated circuitry and several functions may be carried out by the same element.

Each signal received by the digital signal processor 21 on the respective inputs 19a–h is input to a respective channel impulse response (CIR) estimator block 30. The CIR estimator block 30 includes memory capacity in which the estimated channel impulse response is stored. The CIR estimator block 30 also includes memory capacity for temporarily storing a portion of the received signal. The channel impulse response estimator block 30 is arranged to estimate the channel impulse response of the channel of the respective input 19a–h. As already discussed an associated channel can be defined for the given data burst transmitted in the selected frequency band, the allocated time slot and the beam direction from which the signal is received. The beam direction from which a signal is received is ascertained with the help of the Butler matrix circuitry 8 so that a signal received at input 19a of the digital signal processor represents mainly the signal that has been received from the direction of beam $b_1$ and so on. It should be appreciated that the signal received at a given input may also include the side lobes of the signal received on, for example, adjacent inputs.

Each data burst which is transmitted from a mobile station MS to the BTS 4 includes a training sequence TS. However, the training sequence $TS_{RX}$ which is received by the BTS 4 is affected due to noise and also due to multipath effects which leads to interference between adjacent bits of the training sequence. $TS_{RX}$ is also affected by interference from other mobile stations, for example mobile stations located in other cells or cell sectors using the same frequency which may cause co-channel interference. As will be appreciated, a given signal from the MS may follow more than one path to reach the BTS and more than one version of the given signal may be detected by the antenna array 6 from a given direction. The training sequence $TS_{RX}$ which is received from input 19a is cross correlated by the CIR estimator block 30 with a reference training sequence $TS_{REF}$ stored in a data store 32. The reference training sequence $TS_{REF}$ is the same as the training sequence which is initially transmitted by the mobile station. In practice the received training sequence $TS_{RX}$ is a signal modulated onto a carrier frequency while the reference training sequence $TS_{REF}$ is stored as a bit sequence in the data store 32. Accordingly, before the cross-correlation is carried out, the stored reference training sequence is similarly modulated. In other words the distorted training sequence received by the BTS 4 is correlated with the undistorted version of the training sequence. In an alternative embodiment of the invention, the received training sequence is demodulated prior to its correlation with the reference training sequence. In this case, the reference training sequence would again have the same form as the received training sequence. In other words, the reference training sequence is not modulated.

The reference training sequence $TS_{REF}$ and the received training sequence $TS_{RX}$ each are of length L corresponding to L bits of data and may for example be 26 bits. The exact location of the received training sequence $TS_{RX}$ within the allotted time slot may be uncertain. This is because the distance of the mobile station MS from the BTS 4 will influence the position of the data burst sent by the MS within the allotted time slot. For example, if a mobile station MS is relatively far from the BTS 4, the training sequence may occur later in the allotted time slot as compared to the situation where the mobile station MS is close to the BTS 4.

To take into account the uncertainty of the position of the received training sequence $TS_{RX}$ within the allotted time slot, the received training sequence $TS_{RX}$ is correlated with the reference training sequence $TS_{REF}$ n times. Typically, n may be for example 7 or 9. It is preferred that n be an odd number. The n correlations will typically be on either side of the maximum obtained correlation. The relative position of the received training sequence $TS_{RX}$ with respect to the reference training sequence $TS_{REF}$ is shifted by one position between each successive correlation. Each position is equivalent to one bit in the training sequence and represents one delay segment. Each single correlation of the received training sequence $TS_{RX}$ with the reference training sequence $TS_{REF}$ gives rise to a tap which is representative of the channel impulse response for that correlation. The n separate correlations gives rise to a tap sequence having n values. It should be appreciated that some of the taps may be zero or very small. This typically will occur at one or other or both ends of the tap sequence, the maximum value typically being in the middle region of the tap sequence.

Figure 5:
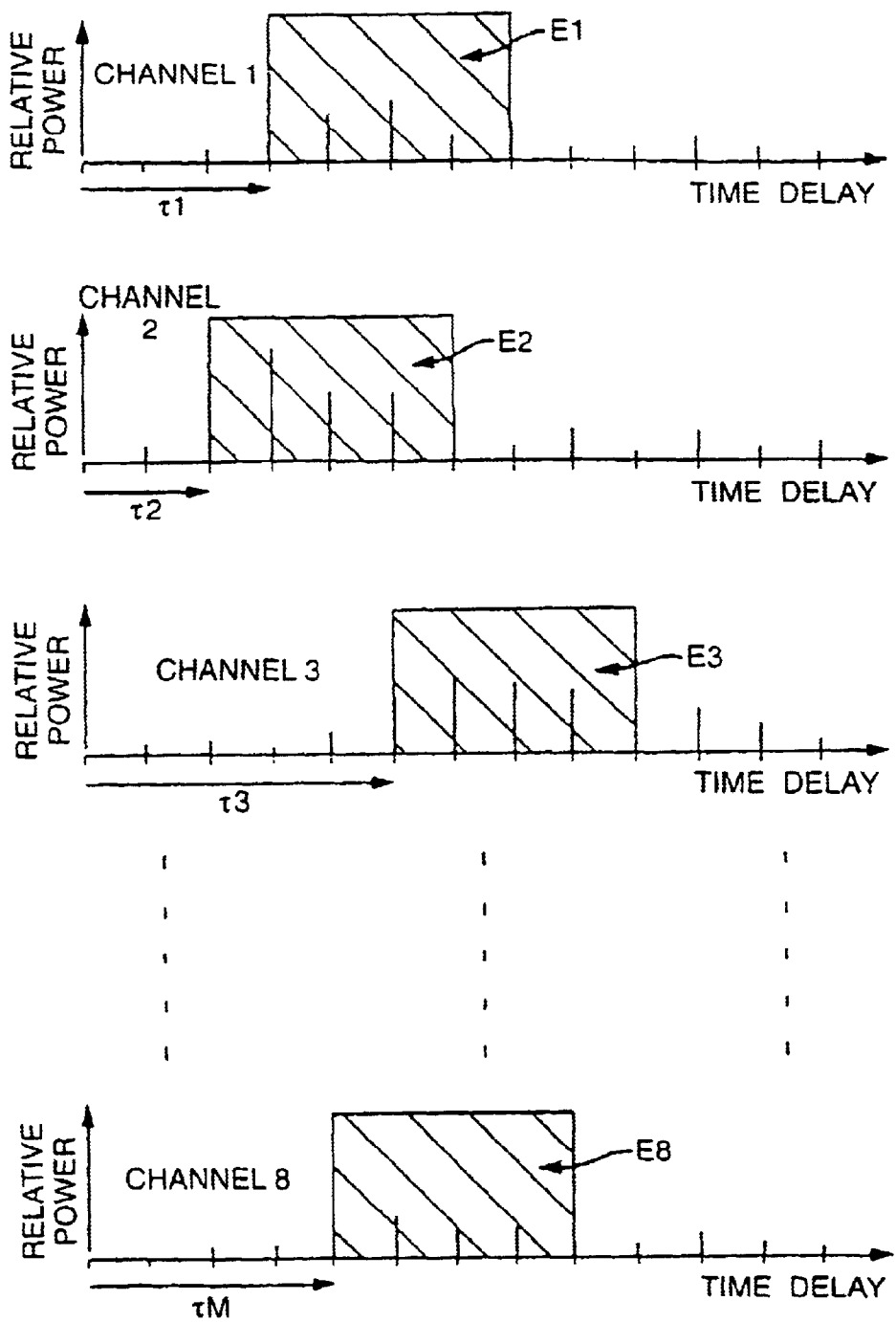
FIG. 5 illustrates the channel impulse response for four channels, out of the eight channels.

Reference is now made to FIG. 5 which shows the channel impulse response for four of the eight possible channels corresponding to the eight spatial directions. In other words, FIG. 5 shows the channel impulse response for four channels corresponding to a given data burst received in four of the eight beam directions from the mobile station, the data burst being in a given frequency band and in a given time slot. The x axis of each of the graphs is a measure of time delay whilst the y axis is a measure of relative power. Each of the lines (or taps) marked on the graph represents the multipath signal received corresponding to a given correlation delay. Each graph will have n lines or taps, with one tap corresponding to each correlation.

From the estimated channel impulse response, it is possible to determine the location of the training sequence within the allotted time slot. The largest tap values will be obtained when the best correlation between the received training sequence $TS_{RX}$ and the reference training sequence $TS_{REF}$ is achieved.

The CIR estimator block 30 also determines for each channel the five (or any other suitable number) consecutive taps which give the maximum energy. The maximum energy for a given channel is calculated as follows:

$$E = \sum_{j=1}^{5} (h_j)^2 \tag{I}$$

where h represents the tap amplitude resulting from a cross correlation of the reference training sequence $TS_{REF}$ with the received training sequence $TS_{RX}$. The CIR estimator block 30 estimates the maximum energy for a given channel by using a sliding window technique. In other words, the CIR estimator block 30 considers each of five adjacent values and calculates the energy from those five values. The five adjacent values giving the maximum energy are selected as representative of the impulse response of that channel.

The energy can be regarded as being a measure of the strength of the desired signal from a given MS received by the BTS 4 from a given direction. This process is carried out for each of the eight channels which represent the eight different directions from which the same data burst could be received. The signal which is received with the maximum energy has followed a path which provides the minimum attenuation of that signal.

A respective analysis block 34 is connected to each CIR estimator block 30. Each analysis block 34 is arranged to store the maximum energy value calculated, by the CIR estimator block 30 to which the respective analysis block 34 is connected for the respective channel, from the five adjacent values selected by the given CIR estimator block 30 as being representative of the channel impulse response. The analysis block 34 is also arranged to store the calculated maximum energy for the N-1 preceding data bursts as well as the energy for the current data burst. The analysis block 34 is arranged to calculate the average energy $\overline{E}_i$ for a particularly channel over N bursts using the following equation:

$$\overline{E}_i = \frac{1}{N} \cdot \sum_{K=1}^{N} E_k \tag{II}$$

where: N=the number of bursts over which the average is computed;

i is the beam number; and $E_k$ is the maximum energy calculated using equation (I) for the ith data burst.

N can have any suitable value in practice and may be in the range of 1–100. However, it should be appreciated that in some embodiments of the present invention N can be greater than 100.

The mean energy of the ith beam is on average, a measure of the aptitude of the ith channel to transport desired information in the up-link direction. Although the channels in the up-link and down-link are not statistically the same, $\overline{E}_i$ can be regarded as giving, on average, some useful information for the down-link transmission.

Thus, a value for $\overline{E}_i$ which exceeds a given threshold is an indication that during the N last received bursts the attenuation of the ith channel was on average lower than a typical channel attenuation and that therefore the power for down-link transmission of the next burst can be reduced and vice versa. It should be appreciated that as this control operates by averaging energies of the last N received bursts, the system is effective on average and not necessarily effective in every burst.

The calculated average energy values for the respective beams are output by the respective analysis blocks 34 to a look-up table block 101. The look-up table block 101 first quantises the average energy values received from each of the eight beam directions. The look-up table block 101 has a look-up table with the power level associated with each of the possible quantised energy values. This power level is the power level to be used in a particular beam direction for transmitting a signal to a given MS. It should be appreciated that the look-up table may include the quantised energy levels with the associated power level. The look-up table may thus be addressed by the calculated average energy values. Thus, the input to the look-up table is the calculated average energy and the output is the output power for the corresponding output power amplifier 26 or the associated control signal to set the desired power.

The look-up table is generated such that a reliable relationship between the average received energy and the output power can be established. The equivalent average path loss of each channel and hence the power level for the down-link transmission can be estimated based on the knowledge of the output transmission power employed by the mobile station and the estimate of the mean received energy from the given mobile station. In this way values for the look-up table can be generated. The power level values are estimated so that down-link transmission power in a given beam direction achieves on average a certain level of signal in the desired mobile station MS. The contents of the look-up table may be fixed or alternatively may be dynamically changed, for example, in accordance with power measuring reports received from the mobile station MS in question. Additional information can be used to compute the look-up table. For example the distance between the mobile station MS and the BTS may be taken into account. This distance can be calculated from timing advance information. The validity of known attenuation laws in the radio channel can also be taken into account. Different radio environments may have different attenuation laws. By determining which attenuation law is applicable, the conditions of a particular radio environment can be taken into consideration.

It should be noted that as the correlation between the up-link and down-link channels increases the channels become more and more reciprocal and the amount of previous information required to make a decision on the power level can be reduced. In other words, N can be reduced. The degree of correlation between the up-link and down-link channels can vary in dependence on the location and nature of the cell or cell sector. It should also be appreciated that the degree of correlation of a given location cell or cell sector may vary over time. The value of N may therefore be different for different base transceiver stations. Additionally, the radio environment of a cell may vary with time and/or location of the mobile station within the cell. In the limit, when up-link and down-link channels are fully reciprocal, N=1 and in this situation the level of power to be used during down-link transmission can be estimated directly from the amount of energy received in the previous up-link burst. However this limit situation does not usually occur. It should be appreciated that in embodiments of the present invention, N can be fixed or can be variable. In the latter case, N can be varied in accordance with certain parameters such as, for example, signal quality reports from the mobile station MS in question so that maximum performance can be achieved.

In one modification to the present invention, instead of calculating the average energy values for the respective beams and using the look-up table to make an association between those average values and the power level, the look-up table can make an association between the distance between the base station and the mobile station and the power level. Alternatively, an association can be made between the type of radio environment and the power level. Instead of using average values, instantaneous values might be used and in particular the instantaneous energy values. However, it is preferred that the average energy be used and the association be between the average energy and the power level be made. In all of these described alternatives, a look-up table would again be provided to make the necessary association.

Each analysis block 34 may also analyse the channel impulse responses determined by the CIR block 30 to ascertain the minimum delay τ. The delay is a measure of the position of the received training sequence $TS_{RX}$ in the allotted time slot and hence is a relative measure of the distance travelled by a signal between the mobile station and the BTS 4. The channel with the minimum delay has the signal which has travelled the shortest distance. This shortest distance may in certain cases represent the line of sight path between the mobile station MS and the BTS 4.

The analysis block 34 may be arranged to determine the position of the beginning of the window defining the five values providing the maximum energy. The time delay is then determined based on the time between a reference point and the beginning of the window. That reference point may be the common time when all received training sequences in each branch start to be correlated, the time corresponding to the earliest window edge of all the branches or an equivalent common point. In order to accurately compare the various delays of the different channels, a common timing scale is adopted which relies on the synchronisation signal provided by the BTS 4 in order to control the TDMA mode of operation. In other words, the position of the received training sequence $TS_{RX}$ in the allotted time slot is a measure of the time delay. It should be appreciated that in known GSM systems, the delay for a given channel is calculated in order to provide timing advance information. Timing advance information is used to ensure that a signal transmitted by the mobile station to the BTS falls within its allotted time slot. The timing advance information can be determined based on the calculated relative delay and the current timing advance information. If the mobile station MS is far from the base station, then the MS will be instructed by the BTS to send its data burst earlier than if the mobile station MS is close to the BTS. The results of this analysis may be input to the look-up table block 101.

The look-up table block 101 may also make a determination as to which beams are actually to be selected as well as determining the power of the selected beam or beams. There are a number of different ways in which this can be achieved. If, for example, the look-up table block 101 is to determine a single beam direction for a given burst, then the look-up table block 101 may ascertain which channel and hence which beam direction has the desired maximum energy for a given data burst in a given frequency band in a given time slot. This means that the beam direction from which the strongest version of the given data burst is received can be ascertained. This direction may be used as the selected beam direction. The power of the beam would be that which is determined from the look-up table of the look-up table block 101 for the determined average energy for the respective beam direction. Alternatively, the look-up table block 101 may ascertain which of the channels has a minimum delay. In other words, the channel and hence the beam direction having the data burst which has followed the shortest path can be ascertained and used as the selected beam direction for a given data burst. The power would again be determined by the look-up table of the look-up table block 101 using the calculated average energy.

In preferred embodiments of the present invention, more than one beam direction can be selected by the look-up table block 101 for a given data burst. For example, the two directions from which the strongest version of a given data signal are received can be selected as the given beam directions. Likewise, the two beam directions providing the signal with the least delay may be selected as the beam directions. It would of course be possible for the look-up table block 100 to ascertain the direction from which the strongest signal is received as well as the direction having the least delay and selecting those two directions as the selected directions. In these embodiments the power of at least one but preferably all of the selected beams is set in accordance with values ascertained from the look-up table of the look-up table block 101. In one embodiment of the invention, three beams are selected. In a further alternative, one beam direction could be selected as outlined hereinbefore and the further beam or beams selected could be directly adjacent the first selected beam direction. In all of these variations, it is preferred that the power level be obtained using the look-up table, as outlined hereinbefore. By controlling the power of the beams individually, the amount of interference which is generated can be reduced.

The look-up table block 101 provides an output to generating block 38 which indicates which beam directions are to be used to transmit signals from the BTS 4 to the MS and also the appropriate power level to be used with each of those beam directions.

Generating block 38 is responsible for generating the signals which are to be output from the digital signal processor 21. The generating block 38 has an input 40 representative of the speech and/or information to be transmitted to the mobile station MS. Generating block 38 is responsible for encoding the speech or information to be sent to the mobile station MS and includes a training sequence and a synchronising sequence within the signals. Generating block 38 is also responsible for production of the modulating signals. Based on the generated signal and determined beam direction, generating block 38 provides signals on the respective outputs 22a–h of the digital signal processor 21. The generating block 38 also provides an output 50 which is used to control the amplification provided by the respective amplifiers 26 to ensure that the signals transmitted in the one or more beam directions have the required power levels. This output 50 comprises the power level or control signal for the power level determined from the look-up table of the look-up table block 101. It should be appreciated that the power level for each of the amplifiers 26 can be individually set.

The output of the channel impulse response block 30 is also used to equalise and match the signals received from the mobile station MS. In particular, the effects of intersymbol interference resulting from multipath propagation can be removed or alleviated from the received signal by the matched filter (MF) and equaliser block 42. It should be appreciated that the matched filter (MF) and equalizer block 42 has an input (not shown) to receive the received signal from the MS. The output of each block 42 is received by recovery block 44 which is responsible for recovering the speech and/or the information sent by the MS. The steps carried out by the recovery block include demodulating and decoding the signal. The recovered speech or information is output on output 46.

Reference will now be made to FIGS. 6 to 9 in order to explain the purpose of the modulators 25. The situation where no phase modulators 25 are provided will first be considered. If more than one beam is selected and the beams are adjacent, then the adjacent beams will tend to interact in the region of overlap between the beams. The degree of interaction in the region of overlap is largely determined by the phase difference between signals applied to the inputs 10 of the Butler matrix circuitry 8 for the respective beam directions which have been selected.

In theory, the phase of the signals provided at the inputs 10 of the Butler matrix circuitry 8 should be the same. However, each signal arrives at the respective input 10 of the Butler matrix circuitry 8 via its own power amplifier 26 and cable 27. Although the power amplifiers 26 and cables 27 are similar, they are not identical. This means that the phase shift caused by these elements is not identical. Thus identical signals output on adjacent outputs 22 of the digital signal processor 21 at the same time will arrive at the respective input 10 of the Butler matrix circuitry 8 with different phases. The phases of the signals are thus different and the phase difference between the signals is unknown. This leads to uncertainty in the resulting beam pattern defined by the selected beams particularly in the region of overlap. The difference in the phases of two adjacent beams could cause there to be a null area in this region of overlap. This would mean that if a mobile station MS were in the null region, the mobile station MS would not be served by the base station BTS.

Figure 6:
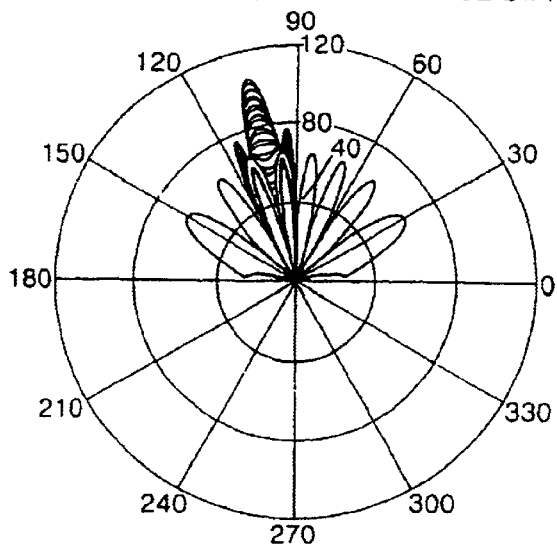
FIG. 6 illustrates the array pattern obtained when two adjacent beams are selected and random phase difference is used.

To deal with this problem it is proposed in embodiments of the present invention to provide a phase modulator 25 in each path from the digital signal processor 21 to the Butler matrix circuitry 8. The phase modulators 25 are arranged to randomly alter the phase of each signal which passes therethrough. The phase shifts are changed on a burst-by-burst basis. By randomly changing the phase of the signals applied to the respective inputs 10 of the Butler matrix circuitry, a smooth pattern will be obtained on average with no null regions between the two adjacent beams. In this regard, reference is made to FIG. 6 which shows the beam pattern obtained when the phase modulators are used. In the illustrated examples beams $b_5$ and $b_6$ have been selected. In particular FIG. 6 illustrates the different beam pattern responses which are obtained when the phases of the signals of beams $b_5$ and $b_6$ are randomly altered by the modulators 25. As can be seen from this figure, there is on average no null regions between the two beams.

The phase difference between beams $b_5$ and $b_6$ varies between $-\Pi$ and $+\Pi$. The pattern illustrated in FIG. 6 shows the pattern obtained for 100 bursts.

Figure 7:
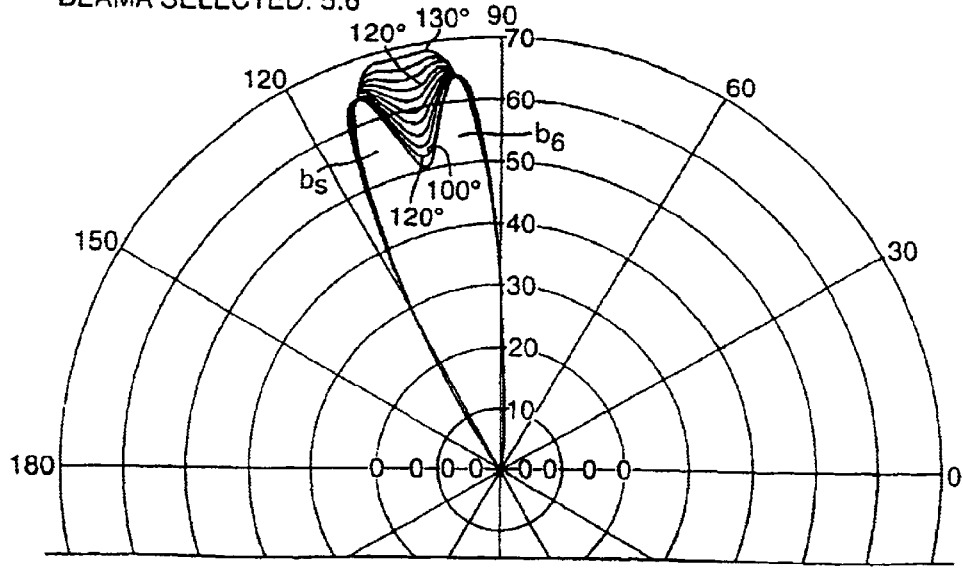
FIG. 7 shows a similar pattern to that of FIG. 6 but shows the pattern generated when the relative phase is varied from 100° to 130° in three degree steps.

Reference is now made to FIG. 7 which shows a similar pattern to the beam pattern of FIG. 6 but shows the beam pattern generated when the relative phase (i.e. phase difference) of beams $b_5$ and $b_6$ is varied from 100° to 130° in 3° steps. When the relative phase is 100°, it can be seen that there is a null region 120 between the beams $b_5$ and $b_6$. However, where the relative phase increases, for example to about 120°, a generally smooth response is obtained covering the whole of the angular sector for beams $b_5$ and $b_6$. Finally, a peaked response is obtained when the relative phase between beams $b_1$ and $b_6$ is 130°. By randomly varying the relative phase using the phase modulators 25, it can be ensured that the null region created, for example when the relative phase between the beams is 100° would only last for a single burst as the phase of the signals are randomly changed on a burst by burst basis.

Reference will now be made to FIG. 8, which illustrates the resulting pattern when three beams are selected. In relation to FIG. 8, it is assumed that three adjacent beams are selected, for example beams $b_5$, $b_6$ and $b_7$. The phase modulators 25 change the phase of the three signals to be input to the Butler matrix circuitry 8 on inputs 10e, 10f and 10h on a burst by burst basis creating a moderate spatial modulation of the resulting beam pattern obtained where more than one beam is selected. The power for the beams can be selected as hereinbefore described or can be selected in any other way. It is assumed in the following that the amplitude of the signal x(t) to be transmitted is a for beam b5, 1 for beam b6 and a for beam b7 where $a \leq 1$.

In simulations the probability that the array response, that is the resulting pattern formed where more than one beam is selected, exceeds a given threshold was determined. The probability was computed for an angular sector corresponding to beams $b_5$, $b_6$ and $b_7$. The graphs shown in FIG. 8 represent a measure of the average response of the array for a relatively large number of bursts. The thresholds used represent particular percentages of the maximum response achieved when a single beam is selected. FIGS. 8a to 8d show the results of the simulations where the upper thresholds are 80%, 70%, 50% and 30% respectively. The parameter a was varied from 0.1 to 1 in steps of 0.1. The probability that the array response exceeds the selected threshold is represented by the y axis whilst the angle in degrees corresponding to the three beams $b_5$, $b_6$ and $b_7$ is represented by the x axis. These graphs can be considered to show an average array response since they represent the statistics of a large number of successive bursts.

Figure 8A:
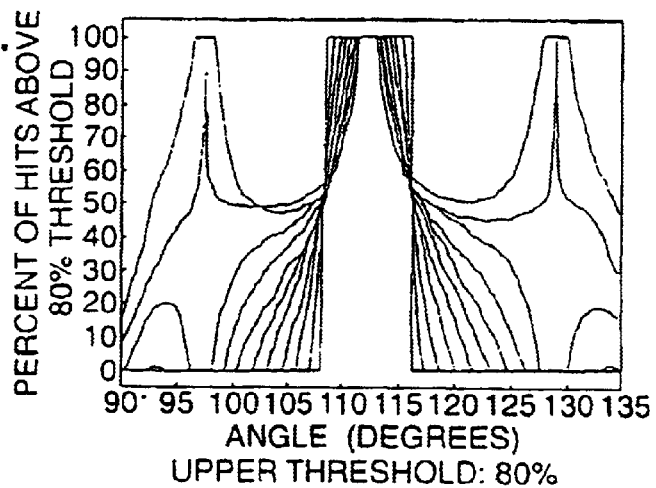
FIGS. 8a–8f show the simulated average array response when three beams are selected, with various thresholds.
Figure 8B:
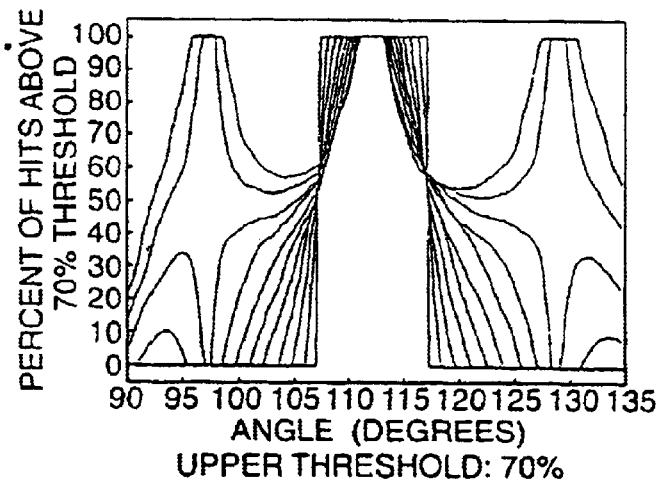
Figure 8C:
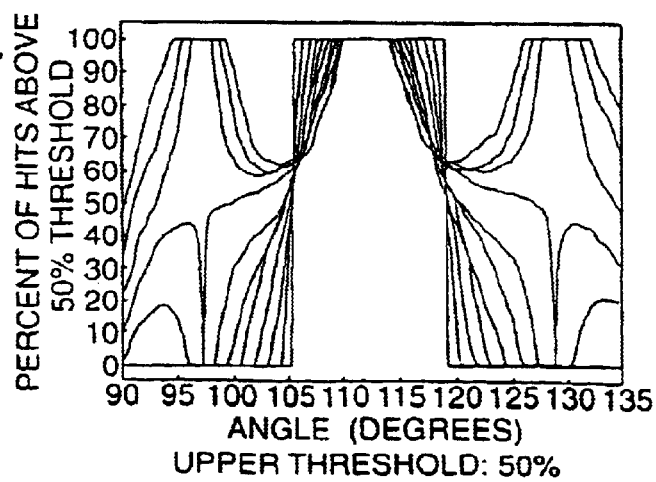
Figure 8D:
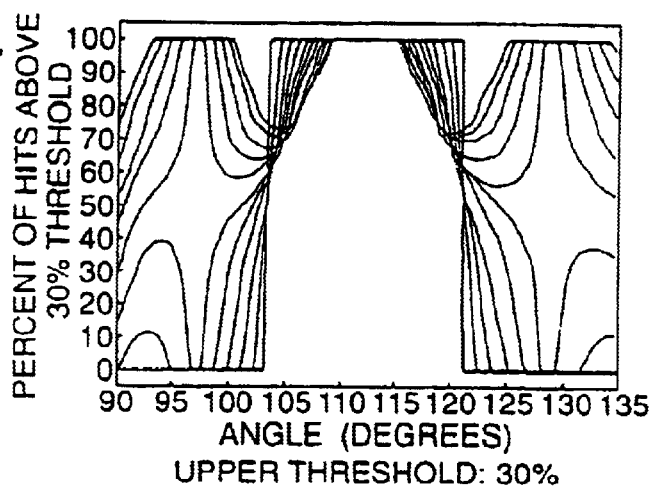

Consider FIG. 8b which has an upper threshold of 70%. This means that the signals which exceed a threshold of 70% of the maximum signal obtained with just one beam are considered. For a=0, the response is only due to the central beam, $b_6$ and it can be seen from FIG. 8b that the response is 100% between approximately 107° to 117° and 0% in the rest of the angular spread. As the value of a is increased, the signals on each side of the central response become more important. In other words the contribution from signals $b_5$ and $b_7$ starts to become more important. As a approaches 1, there are already "peaks" of signals on both sides of the central beam. In other words, as a approaches 1, the amplitude and power of beams $b_5$ and $b_7$ approach that of $b_6$ and the probability figures in the corresponding angular sectors are increased to levels similar to those obtained in the angular sector for beam $b_6$. Beam $b_5$ covers the angular sector from 90° to 105°, beam $b_6$ from 105° to 120° and beam $b_7$ from 120° to 135°.

As can be seen from any of FIGS. 8a to 8d, the average response (or probability that the stated threshold is exceeded) changes with a. With a=0, a response with a central "rectangle" is obtained. As a increases, the signals start to exceed the threshold on both sides of the rectangle.

Figure 8E:
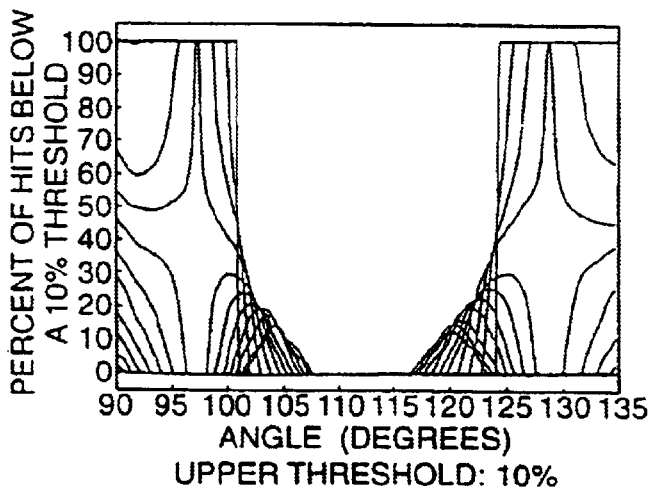
Figure 8F:
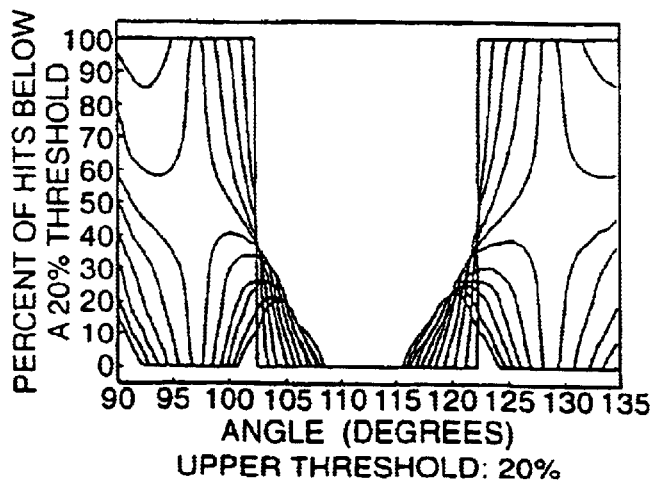

FIGS. 8e and 8f show graphs similar to those of FIGS. 8a to 8d but instead illustrate the probabilities of not exceeding a given threshold. In particular FIG. 8e represents the probability of not exceeding a threshold of 10% whilst FIG. 8f represents the probability of not exceeding a threshold of 20%. As with the case of an upper threshold, there is a clear effect of the beam signal amplitude on probabilities. The lower the threshold is set, the lower the probability that a signal will be below that threshold and vice versa. As the parameter a is increased, the amplitude of the signal transmitted will have an increased amplitude and the probability that the signal will not surpass the threshold is reduced. The areas or angular sectors corresponding to the beams which are required to be free of interference can be controlled by using random phase modulation in association with beam power control.

It should be appreciated that each beam could have its own parameter, e.g. a for beam $b_5$, b for beam $b_6$ and c for beam $b_7$. In the specific example described above, a=c and b=1. However, a, b and c could all be different. a, b and c may be determined based on the results obtained from the look-up table block 101 for the power level. However, in other embodiments of the present invention, other ways can be used to calculate the relative amplitudes of the beams. For example, the values of a, b and c could be determined based on the amount of desired signals received in the corresponding up-link beams etc. It should be pointed out that the power is closely related to amplitude. In particular power= (amplitude)$^2$.

From the results illustrated in FIG. 8, it can be seen that where the amplitude of the three selected beams can be freely chosen, the shape of the probability plot can be modified quite flexibly. Since, on average, the envelope of the signal will follow the probability plot it is possible to achieve a dynamic control over the shape of the array response. The phase modulators 25 allow this control over the shape of the array response to be achieved.

In the above described embodiment, the phase modulators 25 are arranged to randomly alter the phase of the signals passing therethrough. However in alternative embodiments, a non-random pattern may be used to alter the phase of the signals. The predetermined pattern can be modified to take into account one or more of the following factors: radio environment signal levels, distance between mobile station and BTS, and the like. It is preferred that the phase of each signal be altered on a burst-by-burst basis. In this described modification it is preferred that a calibration system for computing the desired phase values be provided.

In the embodiment described hereinbefore, the phases of successive signals applied to a given input are varied randomly as are the phases of successive signals applied to adjacent inputs. In one modification to this embodiment, the phase of the signals applied to a given output may not be varied, whereas the phase of the signals applied to an adjacent input are varied on a burst by burst basis.

It should be appreciated that whilst the above described embodiment has been implemented in a GSM cellular communication network, it is possible that the present invention can be used with other digital cellular communication networks as well as analogue cellular networks. The above described embodiment uses a phased array having eight elements. It is of course possible or the array to have any number of elements. Alternatively, the phased array could be replaced by discrete directional antennae each of which radiates a beam in a given direction. The Butler matrix circuitry can be replaced by any other suitable phase shifting circuitry, where such circuitry is required. The Butler matrix circuitry is an analogue beam former. It is of course possible to use a digital beam former DBF or any other suitable type of analogue beam former. The array may be controlled to produce more than eight beams, even if only eight elements are provided, depending on the signals supplied to those elements.

The number and/or direction of beams which are used to transmit signals to a mobile station may be different to or the same as the number and/or direction of the beams received by the BTS from the MS.

The power level of the beams may be modified after a level has been selected by the look-up table block in order to take in account external factors such as the quality of the received signals etc.

It is also possible for a plurality of phased arrays to be provided. The phased arrays may provide a different number of beams. When a wide angular spread is required, the array having the lower number of elements is used and when a relatively narrow beam is required, the array having the larger number of elements is used.

As will be appreciated, the above embodiment has been described as providing eight outputs from the Butler matrix circuitry. It should be appreciated that in practice a number of different channels will be output on each output of the Butler matrix at the same time. Those channels may be different frequency bands. The channels for different time slots will also be provided on the respective outputs. Whilst individual amplifiers, processors, phase modulators, analogue to digital converters and digital to analogue converters have been shown, these in practice may be each provided by a single element which has a plurality of inputs and outputs.

It should be appreciated that embodiments of the present invention have applications other than just in cellular communication networks. For example, embodiments of the present invention may be used in any environment which requires directional radio communication. For example, this technique may be used in Private Radio Networks or the like.

What is claimed is:

1. A method of directional radio communication between a first station and a second station, said method comprising the steps of:

defining at the first station a plurality of beam directions for transmitting signals to said second station, each of said beam directions being selectable and being generated by an array of antenna elements, each of said elements receiving a signal to be transmitted;

selecting a plurality of beam directions at said first station in which said signal is to be transmitted from said first station to said second station;

transmitting said signal in said plurality of beam directions, the power level of the signal transmitted in each of said selected plurality of beam directions being individually selectable, wherein first and second sequential signals are to be transmitted to said second station, said transmitting step further comprising altering the phase of the first and second signals to be transmitted in at least one of said selected beam directions defined by said antenna array; whereby the phase of the first signal transmitted in at least two of the beam directions differs, the phase of the second signal transmitted in said at least two beam directions differs and the phase difference of the first signal transmitted in said at least two beam directions is different from the phase difference of said second signal transmitted in said at least two beam directions.

2. A method as claimed in claim 1, wherein said at least two beam directions are adjacent.

3. A method as claimed in claim 1, wherein said first station is arranged to transmit a multiplicity of consecutive signals to said second station and the phase of each signal for at least one beam direction is altered such that the phase difference between each consecutive signal transmitted in the selected beam directions is different for consecutive signals.

4. A method as claimed in claim 3, wherein the phase of said consecutive signals is randomly altered.

5. A method as claimed in claim 3, wherein the phase of consecutive signals is altered in accordance with a predetermined pattern.

6. A method as claimed in claim 1 comprising:

receiving at said first station a plurality of consecutive signals from said second station, said signals being receivable from a plurality of beam directions;

determining for at least one of said beam directions a value for a parameter for at least one signal received from said second station in said at least one beam direction;

looking up in a look-up table a power value corresponding to the determined value; and transmitting a signal to the second station in said at least one beam direction, the power of the signal transmitted in said at least one beam direction being determined by the power value looked up in the look-up table.

7. A method as claimed in claim 6, wherein a mean value of the parameter for a plurality of signals is determined and a power value corresponding to the determined mean value is looked up in said look-up table.

8. A method as claimed in claim 7, wherein the parameter is the energy of the signals.

9. A method as claimed in claim 7, wherein said mean energy determined in said determining step is quantized and the quantized mean energy is associated by the look-up table with a corresponding power value.

10. A method as claimed in claim 6, wherein said parameter is one or more of the following parameters: instantaneous energy of a signal; type of radio environment; or distance between the first and second stations.

11. A method as claimed in claim 6, wherein said power value represents the power of the signal to be transmitted in said beam direction.

12. A method as claimed in claim 6, wherein said power value comprises a control value for controlling the setting of the power level for a signal in a given beam direction.

13. A method as claimed in claim 6, wherein the values in the look-up table are altered in accordance with a parameter of said first station and/or said second station.

14. A method as claimed in claim 12, wherein the values of the look-up table are altered in accordance with the power measuring reports received from said second station.

15. A method as claimed in claim 6, wherein the values for said look-up table are determined based on one or more of the following:

transmission power used by said second station;

distance between the first and second station;

the mean energy of the signals received from the second station in a given beam direction;

distance between the first and second station;

the radio environment;

the validity of a known attenuation law in a channel defined between the first and second stations.

16. A method as claimed in claim 7, wherein the number of signals used to calculate the mean value is varied.

17. A method as claimed in claim 16, wherein the number of signals used to calculate the mean value is dependent on signal quality reports from the second station.

18. A method as claimed in claim 8, wherein the energy of each of said signals received in a given beam direction is determined from the channel impulse response.

19. A method as claimed in claim 6, wherein two beam directions are selected for transmission of a signal to said second station.

20. A method as claimed in claim 6, wherein three beam directions are selected for transmission of a signal to said second station.

21. A method as claimed in claim 6, wherein said first station is a base transceiver station in a cellular network.

22. A method as claimed in claim 6, wherein said second station is a mobile station in a cellular network.

23. A method as claimed in claim 21, wherein said signals are bursts and said phase is altered on a burst-by-burst basis.

24. A first station for directional radio communication with a second station, said first station comprising:

a transmitter comprising an antenna array having a plurality of antenna elements for transmitting a signal in a plurality of beam directions, said beam directions being selectable, said signal being applied to each of said antenna elements to provide said plurality of beam directions;

circuitry for selecting a plurality of beam directions in which first and second signals are to be transmitted from the first station to the second station;

circuitry for altering the phase of the first and second signals to be sent in at least one of the selected beam directions; and a controller for controlling said transmitter, wherein said controller is arranged to individually control the power level of the signal transmitted in each of said selected beam directions, and the controller being arranged to control the transmitter to transmit the first and second signals in said plurality of beam directions, whereby the phase of the first signal in at 25. A first station as claimed in claim 24, wherein said circuitry for altering the phase comprises a phase modulator.

26. A first station as claimed in claim 25, wherein said phase modulator is arranged between the input of a beam former of said transmitter and a signal processor of the first station.

27. A first station as claimed in claim 24, wherein the transmitter means comprises an antenna array which is arranged to provide a plurality of signal beams in a plurality of different directions.

28. A first station as claimed in claim 24, wherein said first station is a base transceiver station in a cellular telecommunications network.

* * * * *